United States Patent
Horng et al.

(12)
(10) Patent No.: US 6,700,293 B1
(45) Date of Patent: Mar. 2, 2004

(54) STATOR STRUCTURE FOR BRUSHLESS DC MOTOR

(75) Inventors: Alex Horng, Kaohsiung (TW); Yin-Rong Hong, Kaohsiung (TW); Ching-Sheng Hong, Kaohshiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 46 days.

(21) Appl. No.: 10/237,015

(22) Filed: Sep. 9, 2002

(51) Int. Cl.[7] .................................................. H02K 1/00
(52) U.S. Cl. ........................ 310/254; 310/216; 310/218
(58) Field of Search ................................. 310/216–218, 310/254, 42, 258; 360/99.08, 99.04, 98.07

(56) References Cited

U.S. PATENT DOCUMENTS

| | | | | |
|---|---|---|---|---|
| 3,459,982 A | * | 8/1969 | Cartier | 310/164 |
| 4,565,938 A | * | 1/1986 | Fawzy | 310/156.69 |
| 4,775,813 A | * | 10/1988 | Janson | 310/257 |
| 4,949,000 A | * | 8/1990 | Petersen | 310/179 |
| 4,999,559 A | * | 3/1991 | Katz | 318/696 |
| 5,808,390 A | * | 9/1998 | Miyazawa et al. | 310/194 |
| 5,854,526 A | * | 12/1998 | Sakamoto | 310/254 |
| 6,509,666 B1 | * | 1/2003 | Huang et al. | 310/254 |

* cited by examiner

*Primary Examiner*—Tran Nguyen
(74) *Attorney, Agent, or Firm*—Bacon & Thomas, PLLC

(57) ABSTRACT

A stator structure for a brushless dc motor in accordance with the present invention mainly comprises a singular magnetic-conductive plate, a coil, and a driver member. The singular magnetic-conductive plate includes a main pole plate, an axial hole, and a plurality of pole faces. The main pole plate is adapted to be a base combined with the coil and the drive member, and defined the axial hole on its center. The edge of the axial hole is projected to form an axial tube. The pole faces are spaced apart equidistant round the axial hole and adjacent to the coil. The singular magnetic-conductive plate further includes at least one assembling hole.

13 Claims, 9 Drawing Sheets

STATOR STRUCTURE FOR BRUSHLESS DC MOTOR

BACKGROUND OF THE INVENTION

1. Field of the Invention

The present invention is related to a stator structure for a brushless dc motor and more particularly to a singular magnetic-conductive plate comprising a main pole plate, an axial hole, and a plurality of pole faces integrated into a singular member to thereby reduce count of motor members, so that the entire thickness of the stator is reduced and the entire structure is simplified.

2. Description of the Related Art

Most of traditional fans have many members, such as a stator seat, an axial tube, a coil, a pole plate, and a printed circuit board etc. However, the total thickness of the traditional fan cannot be effectively reduced and it is undesired for an electronic device with a specific thin thickness, notebook computer for example.

U.S. Pat. No. 5,093,599, issued to HORNG on Mar. 3, 1992, as shown in FIG. 1, discloses a brushless dc motor. The motor 1 mainly includes a stator seat 2, an upper pole plate 3, a lower pole plate 4, an axial tube 5, and a printed circuit board 6. The upper pole plate 3, the lower pole plate 4, and the printed circuit board 6 are stacked on either side of the axial tube 5 by means of connection of the axial tube 5 when assembled. Consequently, the stacked combination of the stator members must increase their axial thickness.

The stator remains a specific thickness, although the stator members are reduced their element thickness. In reduction of stator members, the thickness of the stator cannot reduce if the count of the stator members had fixed. However, the thickness of the stator is reduced when a plurality of stator members is integrated into a singular member.

The present invention intends to provide a stator structure for brushless dc motor comprising a singular magnetic-conductive plate consisted of a main pole plate, an axial hole, and pole faces adapted to replace a plurality of stator members in such a way to mitigate and overcome the above problem.

SUMMARY OF THE INVENTION

The primary objective of this invention is to provide a stator structure for a brushless dc motor comprising a singular magnetic-conductive plate including a main pole plate adapted to be a base receiving a coil, so as to simplifying the entire structure of the stator structure and reducing the count of the stator members.

The secondary objective of this invention is to provide the stator structure for the brushless dc motor comprising a singular magnetic-conductive plate consisted of a main pole plate, an axial hole, and pole faces adapted to replace a plurality of stator members, so as to simplifying the entire structure of the stator structure and reducing the count of the stator members.

The stator structure for the brushless dc motor of the present invention mainly comprises a singular magnetic-conductive plate, a coil, and a driver member. The singular magnetic-conductive plate includes a main pole plate, an axial hole, and a plurality of pole faces. The main pole plate is adapted to be a base combined with the coil and the drive member, and defined the axial hole on its center. The edge of the axial hole is projected to form an axial tube. The pole faces are spaced apart equidistant round the axial hole and adjacent to the coil. The singular magnetic-conductive plate further includes at least one assembling hole.

Another aspect of the present invention is each of the pole face comprising an inclined edge to thereby generate irregular magnetic field for easily start.

Another aspect of the present invention is a set of the pole faces comprising inner pole faces and outer pole faces to thereby form multiple pole layers for increasing design choice.

Another aspect of the present invention is the pole face being bent to form axial pole faces aligned with a permanent magnet of a stator between which to form an axial gap.

Other objectives, advantages and novel features of the invention will become more apparent from the following detailed description and the accompanying drawings.

BRIEF DESCRIPTION OF THE DRAWINGS

The present invention will now be described in detail with reference to the accompanying drawings herein.

DETAILED DESCRIPTION OF THE INVENTION

Figure 1:
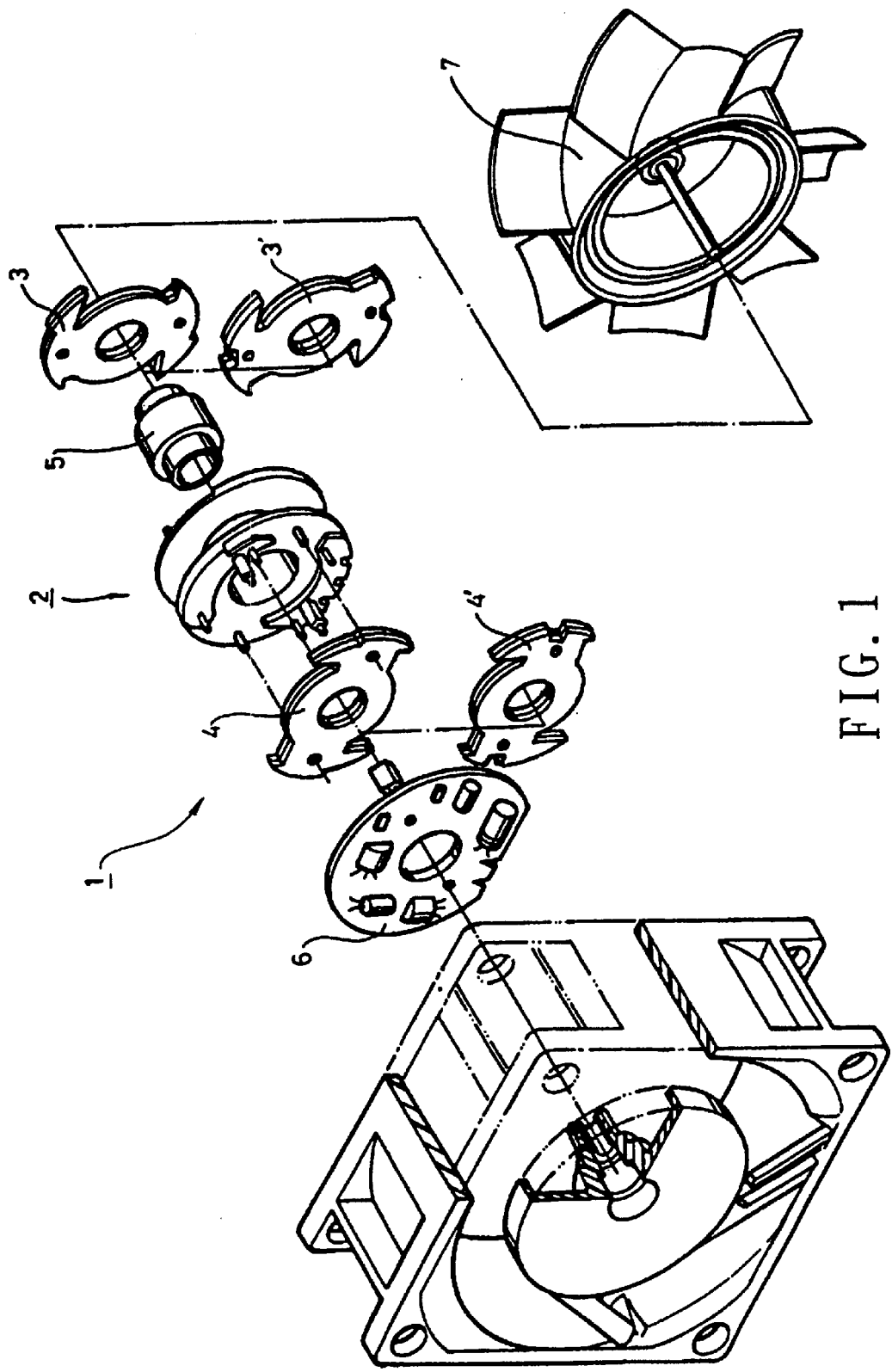
FIG. 1 is a perspective view of a conventional brushless dc motor in accordance with U.S. Pat. No. 5,093,599.

Referring now to the drawings, there are seven embodiments of the present invention shown therein, all of which include generally a primary stator member and a secondary rotor member.

Figure 2:
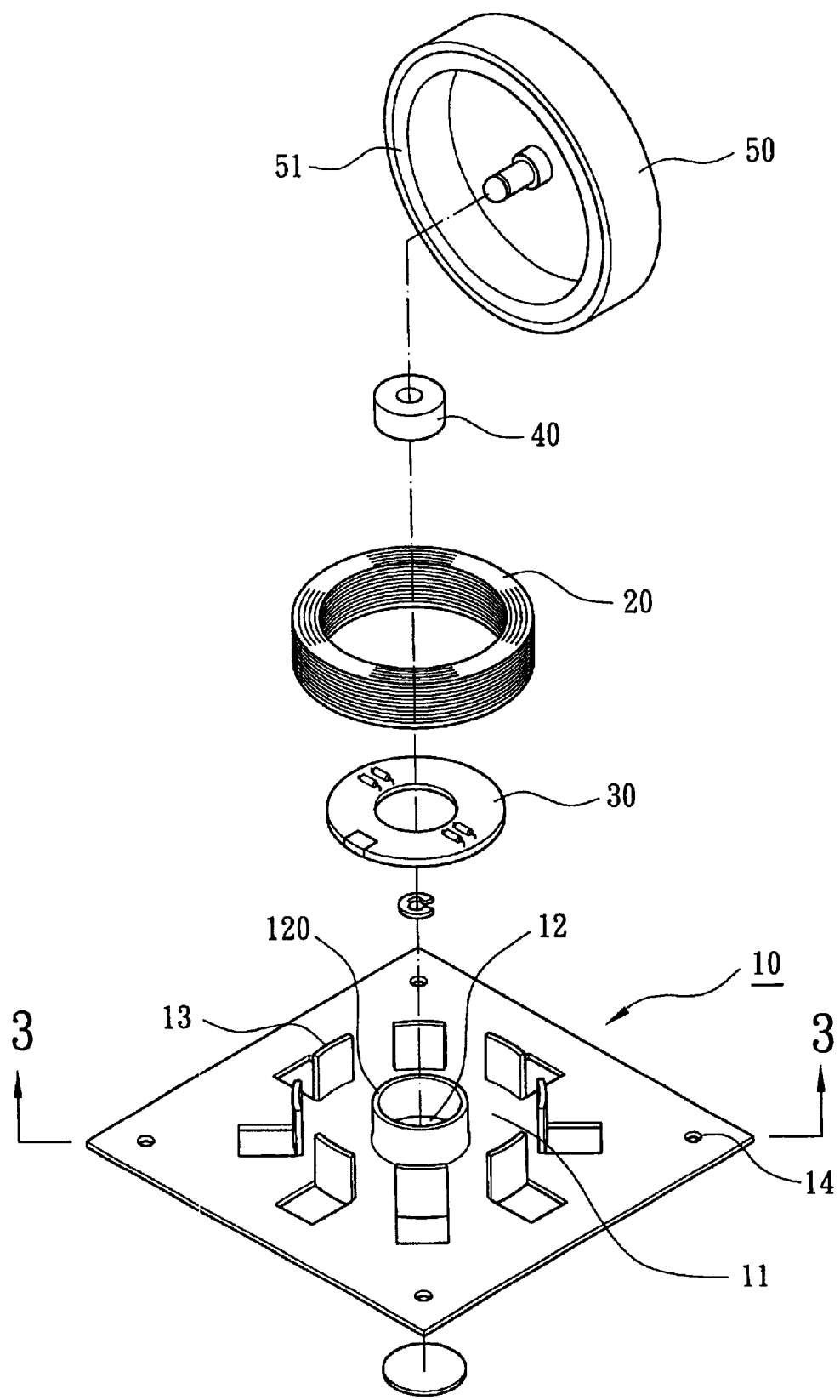
FIG. 2 is a perspective view of a stator structure and a rotor in accordance with a first embodiment of the present invention.
Figure 3:
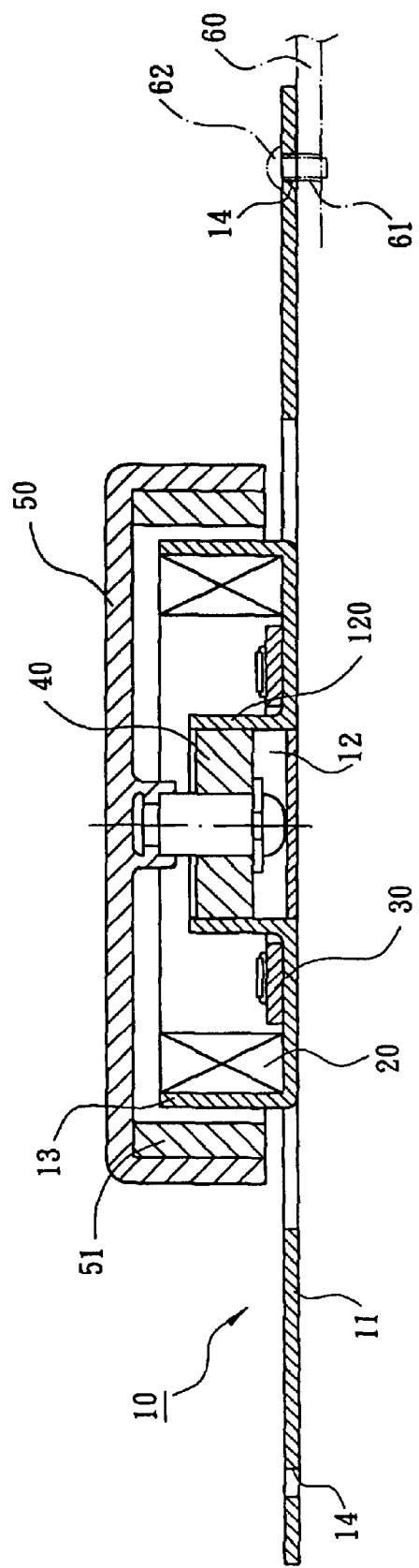
FIG. 3 is a sectional view, taken along line 3—3 in FIG. 2, of the stator structure in accordance with the first embodiment of the present invention.

Referring initially to FIGS. 2 and 3, a stator structure in accordance with the first embodiment of the present invention generally includes a singular magnetic-conductive plate designated as numeral 10, a coil designated as numeral 20, a driver designated as numeral 30, and a bearing designated as numeral 40. The axial assembly of the singular magnetic-conductive plate 10, the coil 20, the driver member 30, and the bearing 40 is combined with a rotor 50 to form a motor.

Construction of the singular magnetic-conductive plate 10 shall be described in detail, referring now to FIGS. 2 and 3. The singular magnetic-conductive plate 10 is made of a punched metal plate. The singular magnetic-conductive plate 10 comprises a main pole plate 11, an axial hole 12, a plurality of pole faces 13, and at least one assembling hole 14.

Assembling the stator shall now be described with reference to FIG. 3. The main pole plate 11 is adapted to be a base combined with the coil 20 and the drive member 30, and defined the axial hole 12 on its center. An axial tube 120 is projected from the edge of the axial hole 12, which is used to receive a shaft of the rotor 50. Preferably, the pole faces 13 are spaced apart equidistant on a common circle round the axial hole 12 and adjacent to the coil 20. In assembling, the base of the main pole plate 11 accommodates the coil 20 and the driver member 30 while the axial tube 120 accommodating the bearing 40. The outer periphery of the singular magnetic-conductive plate 10 further includes at least one assembling hole 14 formed at the outer periphery of the main pole plate 11 to thereby assemble the motor at a predetermined position.

Referring again to FIG. 3, when the singular magnetic-conductive plate 10, the coil 20, the driver member 30, and the bearing 40 are nested in assembled relationship within the rotor 50, radial air gaps are formed between the pole faces 13 and a permanent magnet 51. The pole faces 13 may generate alternative magnetic field to thereby rotate the rotor 50 while the coil 20 proximal the inner surfaces of the pole faces 13 are energized to generate alternative magnetic field by the driver member 30.

In installing, the motor is combined with a predetermined position of a plate 60 by means of the assembling hole 14 being connected to a screw hole 61 of the plate 60 by a screw 62.

Referring to FIGS. 4 through 11, reference numerals of a second through seventh embodiments have applied the identical numerals of the first embodiment. Singular magnetic-conductive plates of the second through seventh embodiments have the similar configuration and same function as the first embodiment and the detailed descriptions are omitted.

Figure 4:
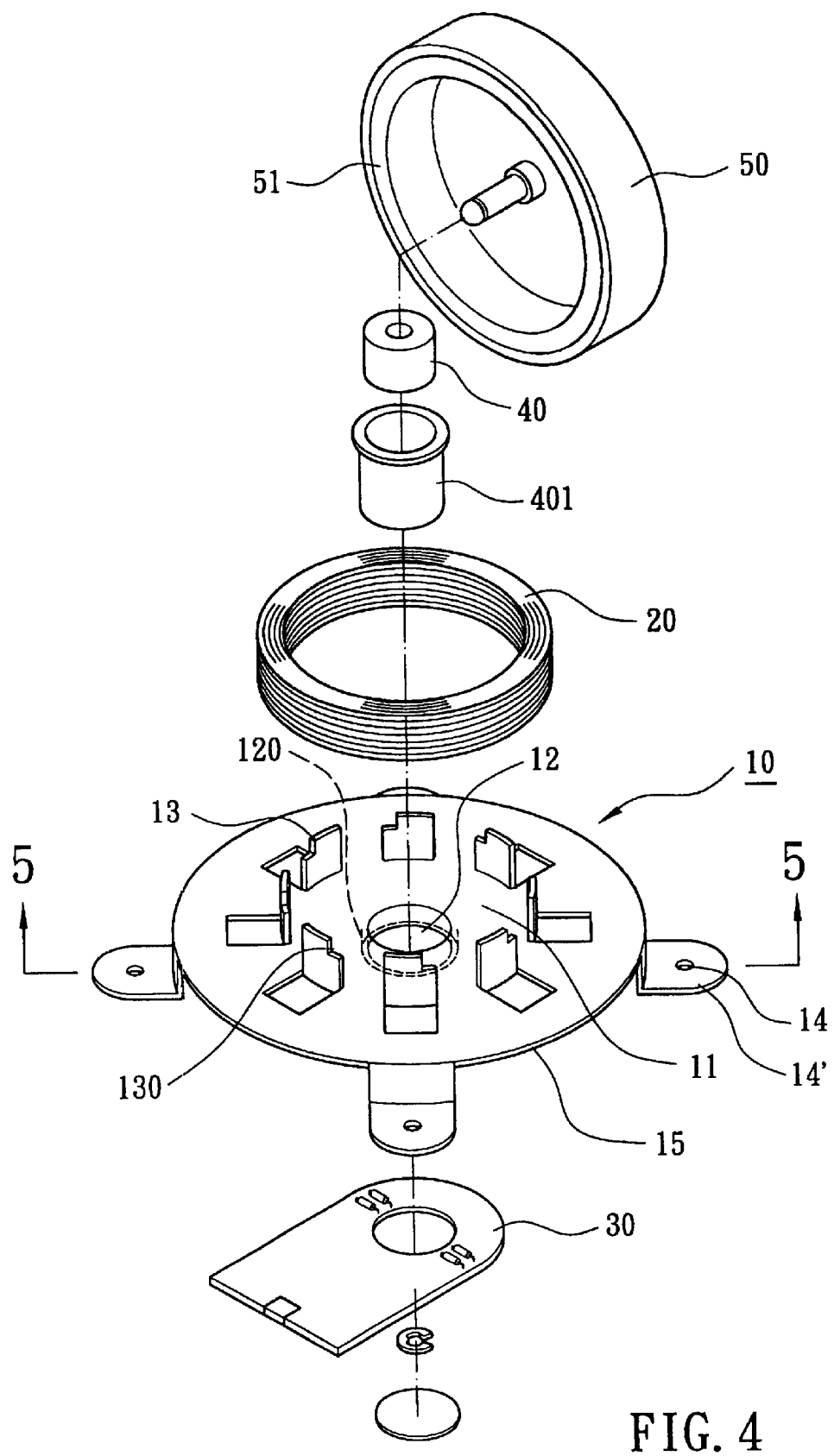
FIG. 4 is a perspective view of a stator structure and a rotor in accordance with a second embodiment of the present invention.
Figure 5:
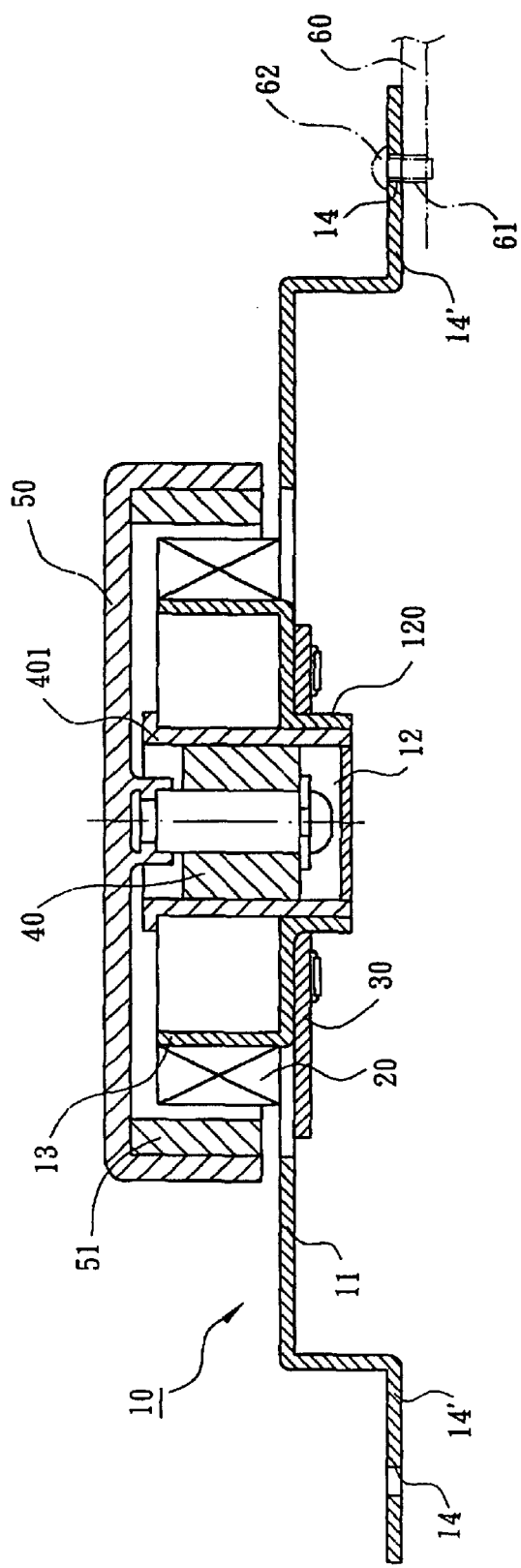
FIG. 5 is sectional view, taken along line 5—5 in FIG. 4, of the stator structure in accordance with the second embodiment of the present invention.

Referring to FIGS. 4 and 5, a singular magnetic-conductive plate 10 in accordance with the second embodiment of the present invention comprises a main pole plate 11, an axial hole 12, a plurality of pole faces 13, at least one assembling hole 14, and a plurality of cut outer edges 15. The cut outer edges 15 are arranged in symmetrical manner to thereby maintain the entire structural symmetry of the singular magnetic-conductive plate 10. Each assembling hole 14 is formed on a lug 14' projected between the two cut outer edges 15. An axial tube 120 is projected from the edge of the axial hole 12, which is used to receive a metal tube 401 of the bearing 40 for combing with a shaft of the rotor 50. The coil 20 is positioned proximate the outer surfaces of the pole faces 13 the front surface of the main pole plate 11 while the driver member 30 is combined with the rear surface of the main pole plate 11. In addition, a neck portion 130 is formed on each of the pole faces 13 to generate an irregular magnetic field for easy start while the pole faces 13 are actuated to rotate the rotor 50.

Referring again to FIG. 5, the coil 20 is positioned on the front surface of the main pole plate 11 while the driver member 30 is combined with the rear surface of the main pole plate 11. In installing, the motor is combined with a predetermined position of a plate 60 by means of the assembling hole 14 being connected to a screw hole 61 of the plate 60 by a screw 62.

Figure 6:
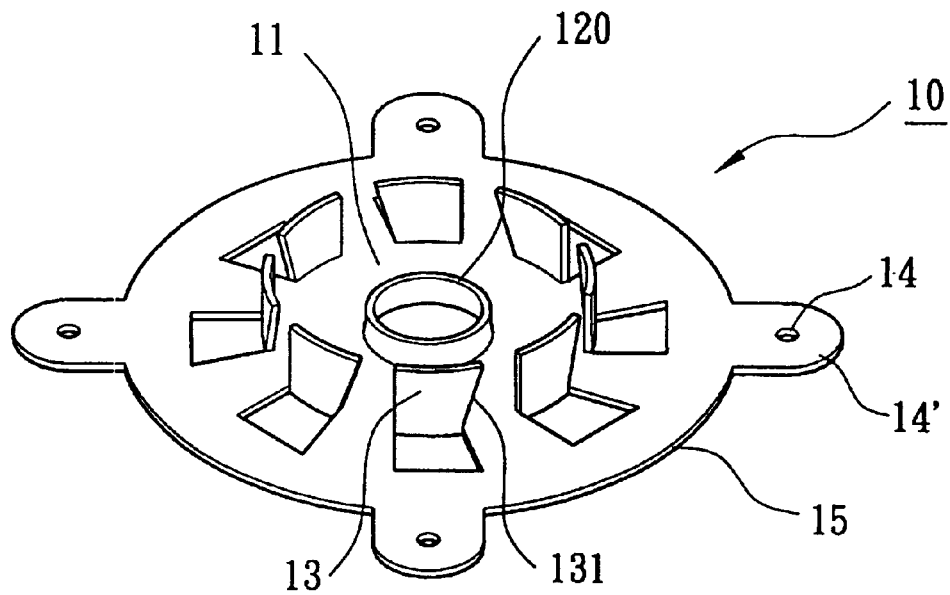
FIG. 6 is a perspective view of a singular magnetic-conductive plate of a stator in accordance with a third embodiment of the present invention.

Referring to FIG. 6, a singular magnetic-conductive plate 10 in accordance with the third embodiment of the present invention comprises a main pole plate 11, an axial tube 120, a plurality of pole faces 13, at least one assembling hole 14, and a plurality of cut outer edges 15. Each of the pole faces 13 has a first inclined edge 131 with an appropriate inclination with respect to a second edge. Consequently, the pole face 13 with the first inclined edge 131 is adapted to generate an irregular magnetic field for easy start while the pole faces 13 are actuated to rotate the rotor 50.

Figure 7:
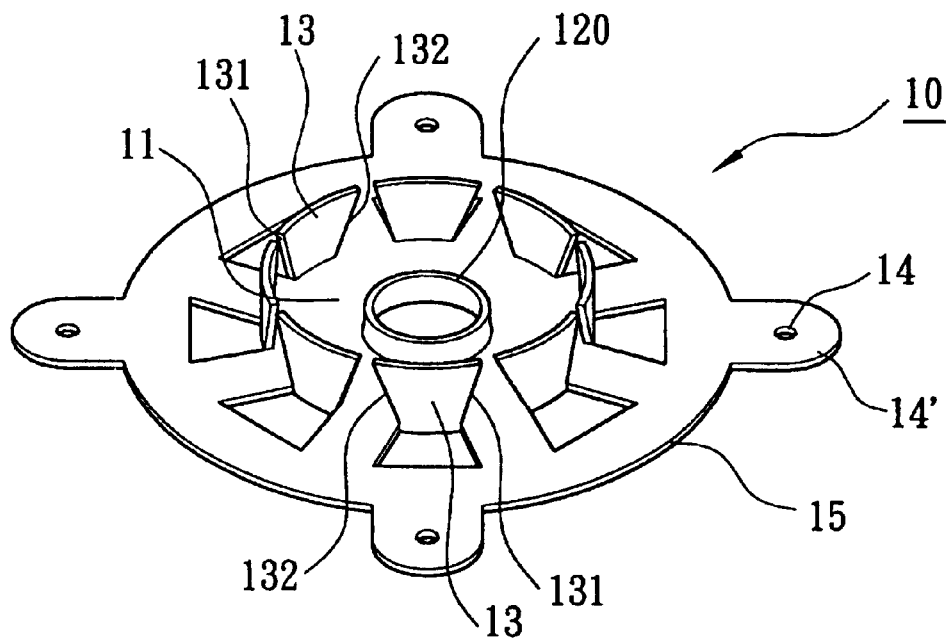
FIG. 7 is a perspective view of a singular magnetic-conductive plate of a stator in accordance with a fourth embodiment of the present invention.

Referring to FIG. 7, a singular magnetic-conductive plate 10 in accordance with the fourth embodiment of the present invention comprises a main pole plate 11, an axial tube 120, a plurality of pole faces 13, at least one assembling hole 14, and a plurality of cut outer edges 15. Each of the pole faces 13 has a first inclination of an inclined first edge 131 and a second inclination of a second inclined edge 132 to thereby increase induced area of the pole face 13. Preferably, the first inclination of the first inclined edge 131 is greater than that of the second inclined edge 132. Consequently, the pole face 13 with the inclined edges 130 and 132 is adapted to generate an irregular magnetic field for easy start while the pole faces 13 are actuated to rotate the rotor 50.

Figure 8:
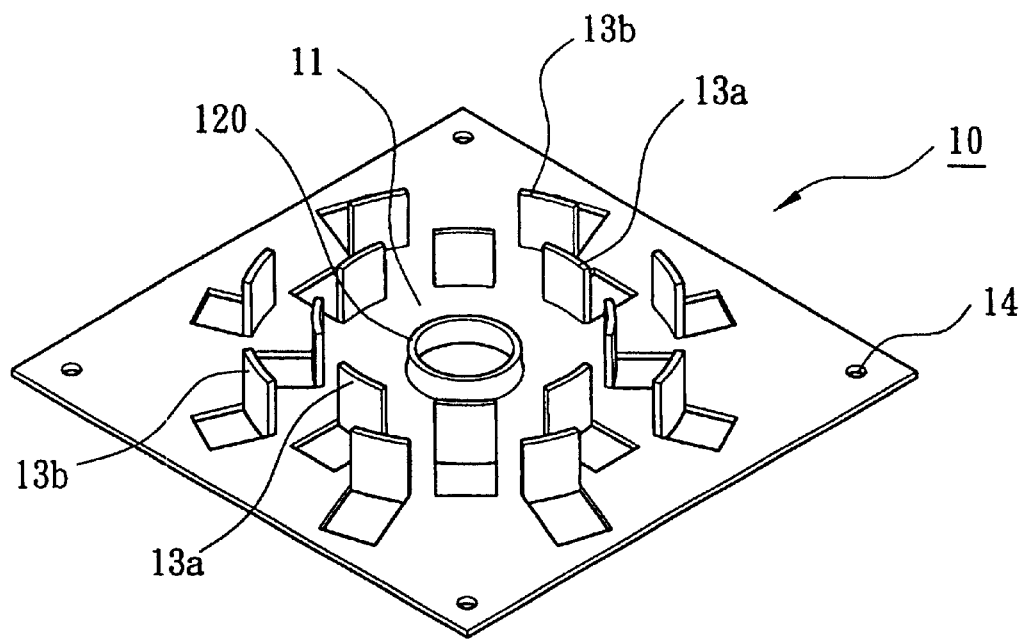
FIG. 8 is a perspective view of a singular magnetic-conductive plate of a stator in accordance with a fifth embodiment of the present invention.

Referring to FIG. 8, a singular magnetic-conductive plate 10 in accordance with the fifth embodiment of the present invention comprises a main pole plate 11, an axial tube 120, a plurality of inner pole faces 13a, a plurality of outer pole faces 13b, and at least one assembling hole 14. The inner pole faces 13a and outer pole faces 13b are spaced apart equidistant on two concentric circles round the axial tube 120 and arranged in a staggered manner. Consequently, the pole faces 13a and 13b are performed multiple pole-face layers, so that the design choice of the stator is increased.

Figure 9:
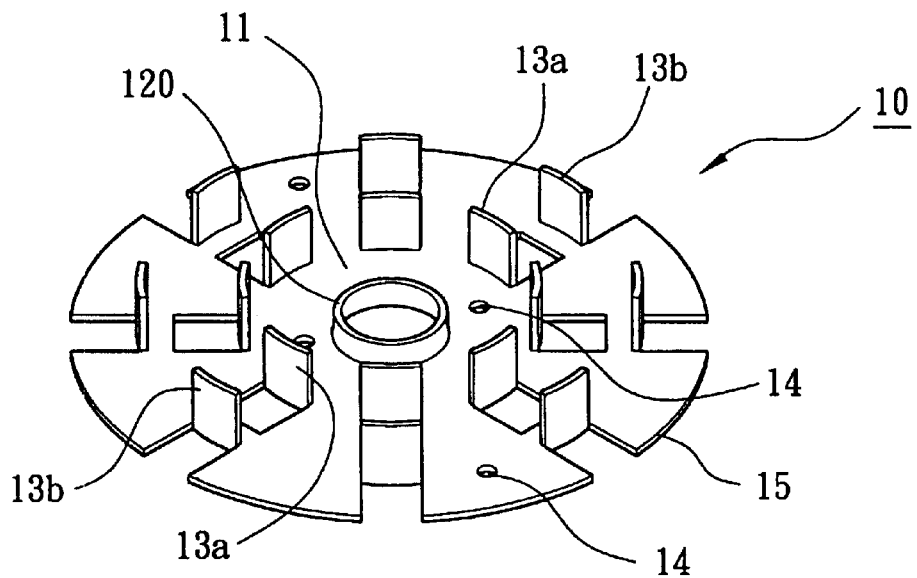
FIG. 9 is a perspective view of a singular magnetic-conductive plate of a stator in accordance with a sixth embodiment of the present invention.

Referring to FIG. 9, a singular magnetic-conductive plate 10 in accordance with the sixth embodiment of the present invention comprises a main pole plate 11, an axial tube 120, a plurality of inner pole faces 13a, a plurality of outer pole faces 13b, and at least one assembling hole 14. The inner pole faces 13a and outer pole faces 13b are spaced apart equidistant on two concentric circles round the axial tube 120 and each of the inner pole faces 13a are aligned with the associated outer pole face 13b on a common radial line. Consequently, the pole faces 13a and 13b are performed multiple pole-face layers, so that the design choice of the stator is increased.

Figure 10:
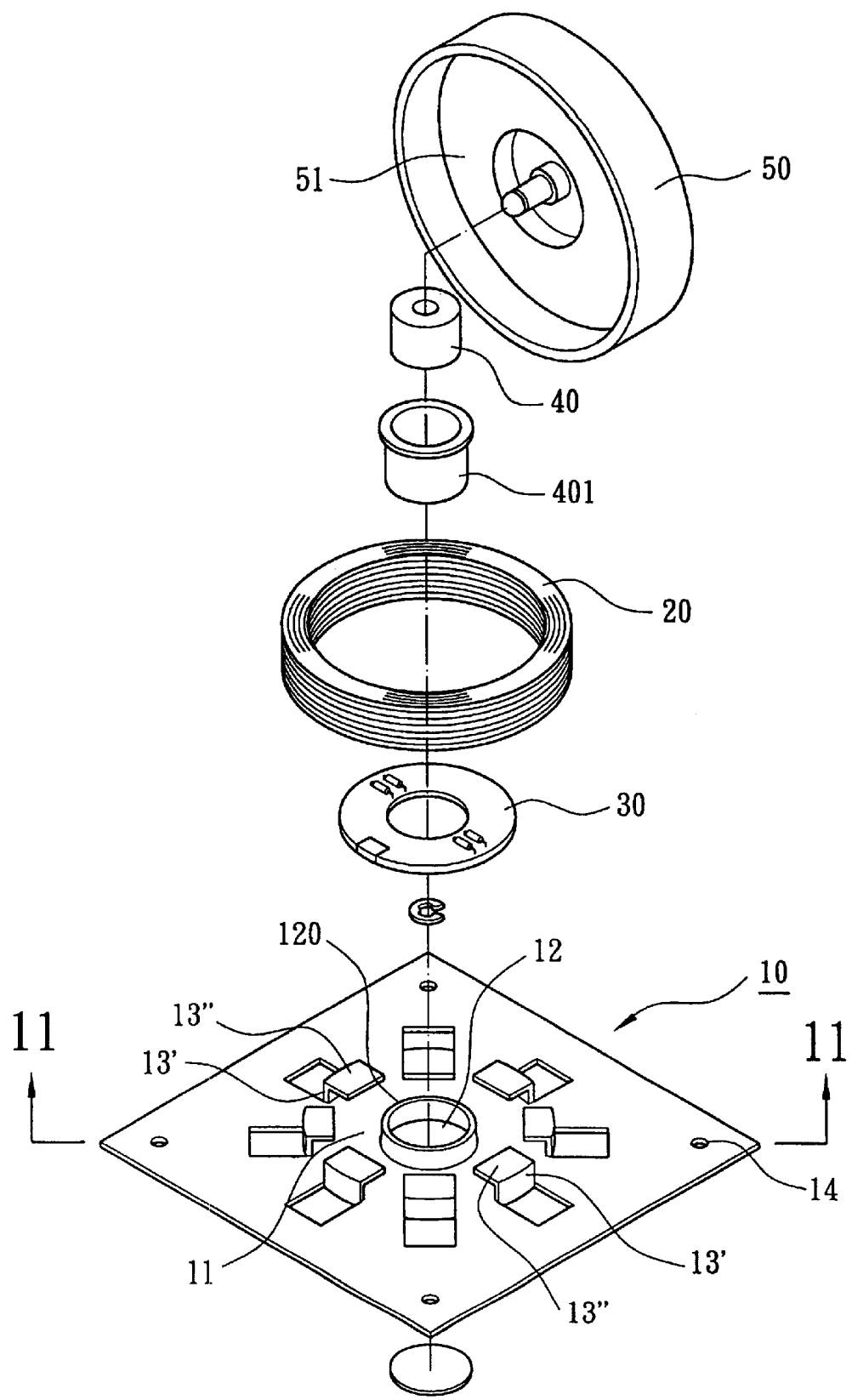
FIG. 10 is a perspective view of a stator structure and a rotor in accordance with a seventh embodiment of the present invention.
Figure 11:
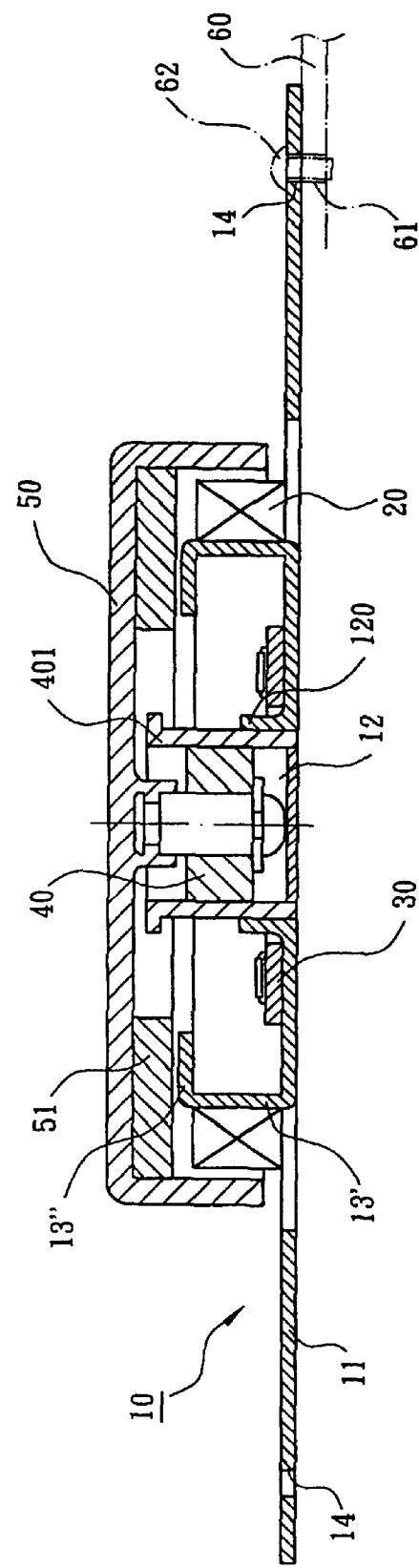
FIG. 11 is sectional view, taken along line 11—11 in FIG. 10, of the stator structure in accordance with the seventh embodiment of the present invention.

Referring to FIGS. 10 and 11, a singular magnetic-conductive plate 10 in accordance with the seventh embodiment of the present invention comprises a main pole plate 11, an axial tube 120, a plurality of pole arms 13', a plurality of axial pole faces 13", and at least one assembling hole 14. The singular magnetic-conductive plate 10 is adapted to generate radial magnetic field so that it is applied to an axial air gap motor of the seventh embodiment in addition to the radial air gap motor of the first through sixth embodiments. Each of the pole faces 13" is bent perpendicular to the pole arm 13' so as to face an axial permanent magnet 51 of a rotor 50 that is induced with an axial magnetic field generated by the pole faces 13" of the stator.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A stator structure for a brushless dc motor, comprising:
   a singular magnetic-conductive plate made of a punched metal plate, the singular magnetic-conductive plate including a main pole plate portion and a plurality of poles, wherein each pole is a punched-metal pole having respective inner and outer faces disposed along an outer periphery of the main pole plate portion;
   a coil positioned at an annular outer periphery of the singular magnetic-conductive plate and at outside periphery of said outer faces of said plurality of poles; and
   a driver member combined with the singular magnetic-conductive plate;
   wherein the coil and the driver member combined with the singular magnetic-conductive plate to thereby reduce an entire thickness of the stator structure.

2. The stator structure for a brushless dc motor as defined in claim 1, wherein the singular magnetic-conductive plate further comprises at least one assembling hole to fix the singular magnetic-conductive plate to a plate.

3. The stator structure for a brushless dc motor as defined in claim 1, wherein the main pole plate portion of the singular magnetic-conductive plate further comprises at least one assembling hole to fix the singular magnetic-conductive plate to a plate.

4. The stator structure for a brushless dc motor as defined in claim 1, wherein the main pole plate portion of the singular magnetic-conductive plate further comprises an axial hole to connect to a metal tube to thereby combine with a rotor.

5. The stator structure for a brushless dc motor as defined in claim 4, wherein the axial hole comprises an inner periphery from which an axial tube is projected, the axial tube to accommodate a bearing to thereby combine with a rotor.

6. The stator structure for a brushless dc motor as defined in claim 1, wherein the singular magnetic-conductive plate further comprises a plurality of cut outer edges defined on an annular outer edge in place to thereby increase entire structural symmetry of the singular magnetic-conductive plate.

7. The stator structure for a brushless dc motor as defined in claim 1, wherein each of the pole faces is formed a neck portion to thereby generate an irregular magnetic field for easy start.

8. The stator structure for a brushless dc motor as defined in claim 1, wherein each of the pole faces has a first inclined edge with an appropriate inclination with respect to a second edge, the pole face with the first inclined edge is to generate an irregular magnetic field for easy start.

9. The stator structure for a brushless dc motor as defined in claim 8, wherein the second edge is a second inclined edge to increase induced area of the pole face.

10. The stator structure for a brushless dc motor as defined in claim 1, wherein the pole faces comprise a plurality of inner pole faces and a plurality of outer pole faces which are spaced apart equidistant on two associated concentric circles.

11. The stator structure for a brushless dc motor as defined in claim 10, wherein the inner and outer pole faces are arranged in a staggered manner.

12. The stator structure for a brushless dc motor as defined in claim 10, wherein each of the inner pole faces are aligned with the associated outer pole face on a common radial line.

13. The stator structure for a brushless dc motor as defined in claim 1, wherein the pole face is an axial pole face which is bent perpendicular to an associated pole arm so as to face an axial permanent magnet of a rotor that is induced with an axial magnetic field generated by the pole faces of the stator.

* * * * *